(12) United States Patent
Yarlagadda

(10) Patent No.: US 7,260,082 B2
(45) Date of Patent: Aug. 21, 2007

(54) SEAMLESS INTERFACING FOR INSTANT MESSAGING AND INTERNET TELEPHONY ACROSS WIRELESS NETWORKS

(75) Inventor: Madhu Yarlagadda, Los Altos Hills, CA (US)

(73) Assignee: Yahoo! Inc., Sunnyvale, CA (US)

( * ) Notice: Subject to any disclaimer, the term of this patent is extended or adjusted under 35 U.S.C. 154(b) by 257 days.

(21) Appl. No.: 11/056,213

(22) Filed: Feb. 10, 2005

(65) Prior Publication Data

US 2005/0259612 A1 Nov. 24, 2005

Related U.S. Application Data

(60) Provisional application No. 60/544,912, filed on Feb. 13, 2004.

(51) Int. Cl.
*H04J 3/24* (2006.01)

(52) U.S. Cl. .................. 370/349; 370/355; 370/392; 455/432.1; 455/450; 709/230; 709/238; 709/249

(58) Field of Classification Search ............. 370/235.1, 370/236.1, 328–330, 389, 395.1, 395.2, 400–402, 370/338, 349, 352–355, 392, 463–467, 469; 455/435, 422.1, 432.1, 432.2, 435.1, 450, 455/455; 709/220, 221, 227, 228, 230, 238, 709/249

See application file for complete search history.

(56) References Cited

U.S. PATENT DOCUMENTS

| | | | |
|---|---|---|---|
| 6,654,359 B1 * | 11/2003 | La Porta et al. ............. | 370/328 |
| 6,757,266 B1 * | 6/2004 | Hundscheidt ................ | 370/328 |
| 6,904,035 B2 * | 6/2005 | Requena ...................... | 370/338 |
| 2002/0035605 A1 | 3/2002 | McDowell et al. | |
| 2002/0057657 A1 * | 5/2002 | La Porta et al. ............. | 370/331 |
| 2003/0193921 A1 | 10/2003 | Kim | |
| 2004/0152417 A1 | 8/2004 | Kim et al. | |
| 2004/0187021 A1 * | 9/2004 | Rasanen ...................... | 713/200 |
| 2004/0260722 A1 | 12/2004 | Allen et al. | |

OTHER PUBLICATIONS

Copy of International Search Report for PCT/US05/04554 dated Jul. 10, 2006.

* cited by examiner

*Primary Examiner*—Edward F. Urban
*Assistant Examiner*—Nhan T. Le
(74) *Attorney, Agent, or Firm*—Darby & Darby PC; Jamie L. Wiegand

(57) ABSTRACT

A method for managing communications while an application location changes between a first wireless network and a second wireless network is provided. The method includes mapping an internal address to a first external address for the first wireless network. A second wireless network is determined to use for sending communications for the application. The internal address is then mapped to a second address for the second wireless network.

20 Claims, 4 Drawing Sheets

SEAMLESS INTERFACING FOR INSTANT MESSAGING AND INTERNET TELEPHONY ACROSS WIRELESS NETWORKS

CROSS-REFERENCES TO RELATED APPLICATIONS

This application claims the benefit of the filing date of U.S. Provisional Patent Application No. 60/544,912 filed Feb. 13, 2004, which is incorporated by reference in its entirety for all purposes.

BACKGROUND OF THE INVENTION

The present invention generally relates to communications and more specifically to communications using instant messaging over multiple wireless networks.

The build out of wireless networks has increased. For example, Wi-Fi networks, Wi-Fi max, cellular networks, etc., are becoming increasingly popular. These networks typically have a certain range that creates a hotspot. A hotspot is an area or range for a wireless network where a user can connect to the network if the user is within the area or range. If the user is not in the hotspot area for a network, the user cannot connect to the network.

Depending on where a user is located, the user may be able to connect to certain networks. It is expected that the user may be able to connect to a wireless network wherever the user may roam but may have to connect to different networks as locations are changed. One issue with the wireless networks is continuous wireless coverage when roaming between networks. Because of the various networks, when a user roams, the coverage may transition from one base station for a network to another base station for the other network. When this happens, it is possible that network coverage is lost while a device reinitiates with the new base station. When a user roams to a different base station, a new IP address for the new base station is initialized. Typically, when a new IP address is initialized, the connection with the old base station is ended and a new connection is started using the new IP address. Accordingly, the user may loose network coverage while the new IP address is initiated with the new base station. This may be interpreted as a failure by an application, such as an IM client. This may cause the IM client to disconnect from a chat or voice over internet protocol (IP) call.

BRIEF SUMMARY OF THE INVENTION

Embodiments of the present invention generally relate to seamless interfacing for instant messaging across wireless networks.

A method for providing instant message communications while roaming between a plurality of base stations is provided. The method comprises: receiving a first external internet protocol (IP) address for a first base station; mapping the first external IP address to an internal IP address for an IM client; allowing communications with the first base station using the external IP address and internal IP address; receiving a second external internet protocol (IP) address for a second base station; mapping the second external IP address to the internal IP address for an IM client; and allowing communications with the second base station using the external IP address and internal IP address.

In another embodiment, an interface for providing IM communications over a plurality of networks is provided. The interface comprises: an internal address store configured to store an internal address for an IM client; a changeable address store configured to store an external address for a base station; an address mapper configured to map the internal address for the IM client to the changeable address, wherein the changeable address changes based on external addresses received from a plurality of base station, the plurality of base station being connected to by the IM client at different times.

In yet another embodiment, a method for managing communications while an application location changes between a first wireless network and a second wireless network is provided. The method comprises: mapping an internal address to a first external address for the first wireless network; determining a second wireless network to use for sending communications for the application; and mapping the internal address to a second address for the second wireless network.

A further understanding of the nature and the advantages of the inventions disclosed herein may be realized by reference of the remaining portions of the specification and the attached drawings.

DETAILED DESCRIPTION OF THE INVENTION

Figure 1:
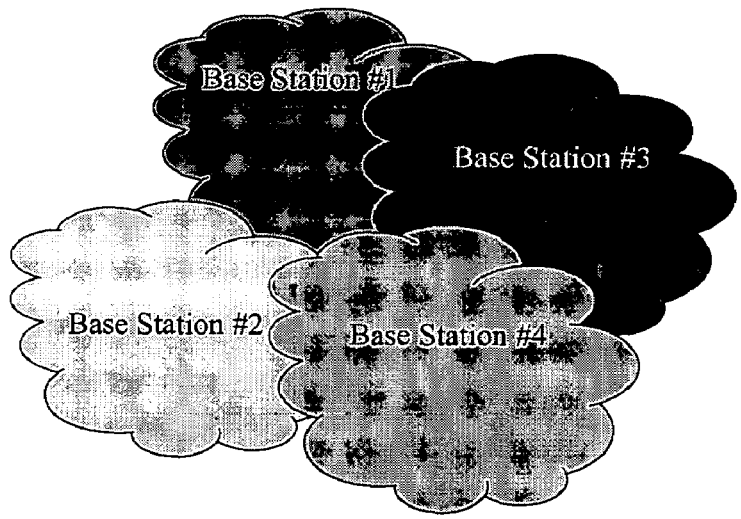
FIG. 1 depicts various base stations according to one embodiment of the present invention.

In conventional instant messaging ("IM") signaling, a first IM client advertises to an IM server that it is "on-line" and available for instant messages directed at that client. The IM server can then indicate to other IM clients that the first IM client is on-line. For routing packets to the first IM client, the IM server preferably tracks the Internet Protocol (IP) address of the first IM client. However, when roaming via base stations, IP addresses tend to change. For example, FIG. 1 shows several base stations. A base station may provide a wireless network. As an IM client travels from the range of one base station to the range of another, its effective IP address might change because different wireless networks tend to have different IP addresses and support different ranges of IP addresses.

With a change of IP address, the IM client could simply drop out, restart and connect to the IM server. However, this might be undesirable where dropouts cause service breaks, such as when voice calls are routed over an IM network or when IM conversations are taking place. To address this and other issues, the IM client is arranged with an internal IP Address (IIP) and a changeable IP address that is used with interacting with the wireless network.

With the advent of longer-range wireless services, such as 802.16, IM usage over wireless networks can be expected to be more prevalent and such features as described here will be even more essential.

FIG. 1 depicts various base stations according to one embodiment of the present invention. As shown, wireless networks 1-4 are provided.

A base station may be any network associated with a certain set of IP addresses. For example, base station #1 may be a wireless hotspot. The base station may be associated with a first wireless network and a set of IP addresses. The base station may enable coverage for a certain range of distance. While a device is in range of the base station, the device can communicate with the base station.

The base stations are typically associated with certain ranges of Internet protocol (IP) addresses. For example, when an IM client is on-line, an IM server is contacted and the IM client indicates that it's on-line and available to receive instant messages directed at the client. An IP address is sent from the IM client to the IM server through the base station. The IM server can then indicate to other IM clients that the first IM client is on-line. The IM server typically tracks the IP address of the IM client and uses the IP address to route packets to the IM client. Although IP addresses are described, it will be understood that other addresses may be used for communicating with the wireless network.

If an IM client roams from base station #1 to base station #2, the IP address for the IM client may change. With the change of IP address, the IM client may simply dropout from the first network, restart, and connect to the IM server again. The reconnection would be done through the base station #2. However, this may be undesirable when dropouts cause service breaks, such as when an IM conversation is ongoing or voice calls are being routed through the IM network from the IM client.

Embodiments of the present invention provide an internal IP address (IIP) and a changeable IP address that are used when interacting with various base stations. The IIP is assigned to an IM client and then associated with the various IP addresses received from wireless networks as the IM client roams between base stations. The IIP does not change when new base stations are connected to. When the IM client roams from a first base station to a second base station, the transition may be seamless without experiencing any connection breakage.

Figure 2:
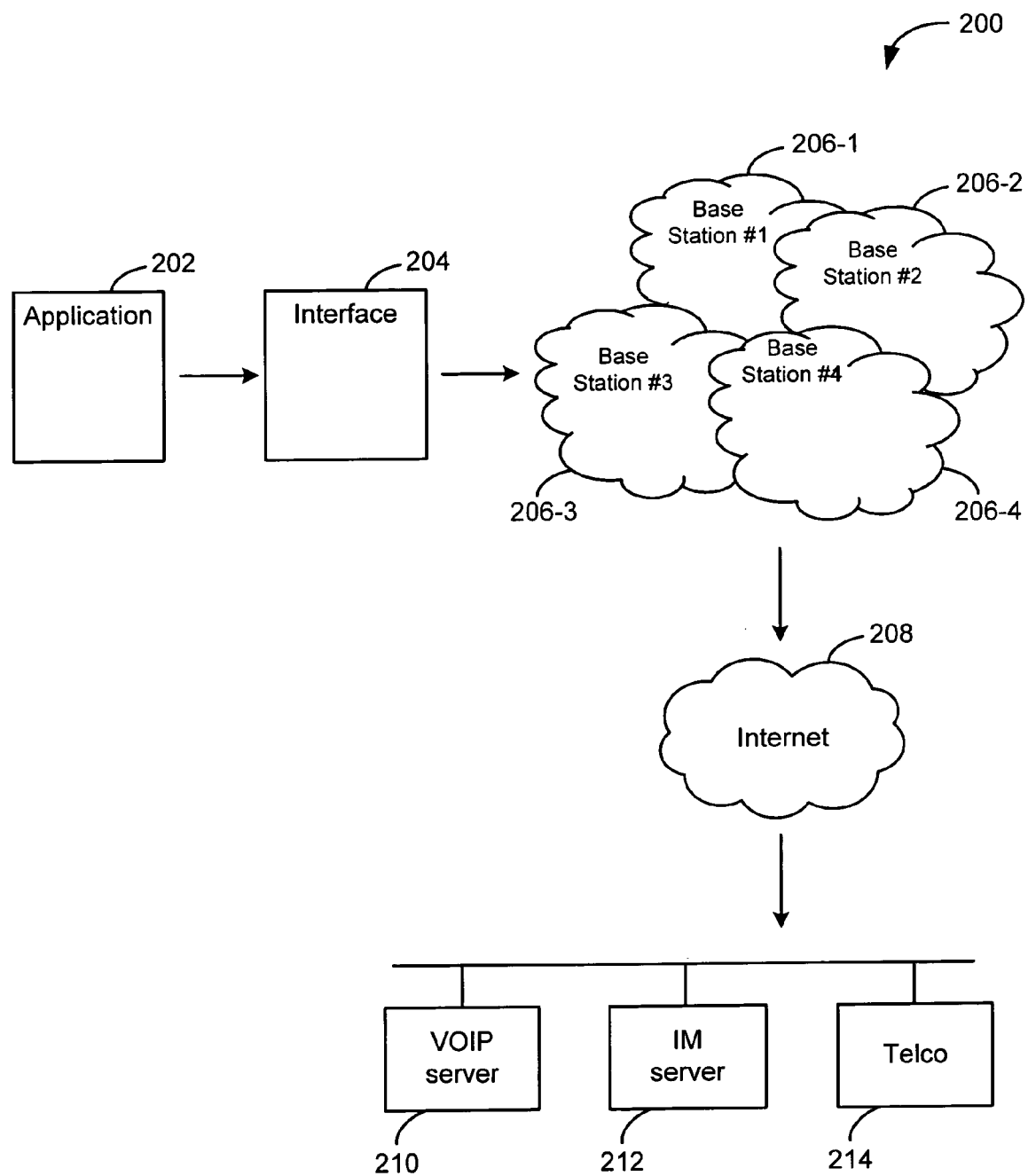
FIG. 2 depicts a system that provides seamless interfacing for instant messaging across base stations according to one embodiment of the present invention.

FIG. 2 depicts a system 200 that provides seamless interfacing for instant messaging across base stations according to one embodiment of the present invention. As shown, application 202, interface 204, base stations 206, internet 208, voice over (VOIP) server 210, and IM server 212, and telco 214 are provided.

Application 202 may be any application that can communicate with a base station. For example, application 202 is an IM client configured to perform instant messaging with other IM clients. In one embodiment, a user may provide a username and log on using an IM client. The IM client may then send presence information to an IM server 212. Presence information may indicate the status of the username. For example, the status may be "on-line," "off-line," "busy," etc. Although instant messaging is described, it will be understood that other applications may also use embodiments of the present invention. For example, a web browser, VOIP applications, video games, etc., may be an application 202.

Interface 204 allows the seamless interfacing for instant messaging and Internet telephoning across the base stations. Interface 204, as described in more detail below, includes an internal IP (IIP) address and a changeable IP address. Using the internal IP address and changeable IP address, interface 204 allows seamless interfacing as an IM client roams between base stations 206.

Internet 208 may be any other network in which packets from application 202 may be sent to/received from. Although the Internet is referenced, it will be understood that Internet 208 may include other networks, such as wireless networks, wireline networks, local area networks, wide area networks, etc.

Telco 214 may receive packets from application 202 and route the packets accordingly. For example, a VOIP call may be initiated by application 202. The VOIP call would go through a wireless network and eventually to telco 214. Telco 214 would then route the VOIP call to a recipient.

IM server 212 is provided to enable instant message communications. For example, application 202 connects with IM server 212 when a user logs on with a username. Presence information is sent to IM server 212, which can then publish the presence information to other IM clients. Connections to other IM clients and IM conversations may be enabled through IM server 212.

Application 202 may also make VOIP calls. For example, an IM client may make VOIP calls to other recipients. Application 202 connects to a VOIP server 210 for a VOIP call. VOIP server 210 then connects the VOIP call to the appropriate recipients. For example, a user may make a VOIP call using an IM client to another IM client, a PSTN phone, an IP phone, etc.

Figure 3:
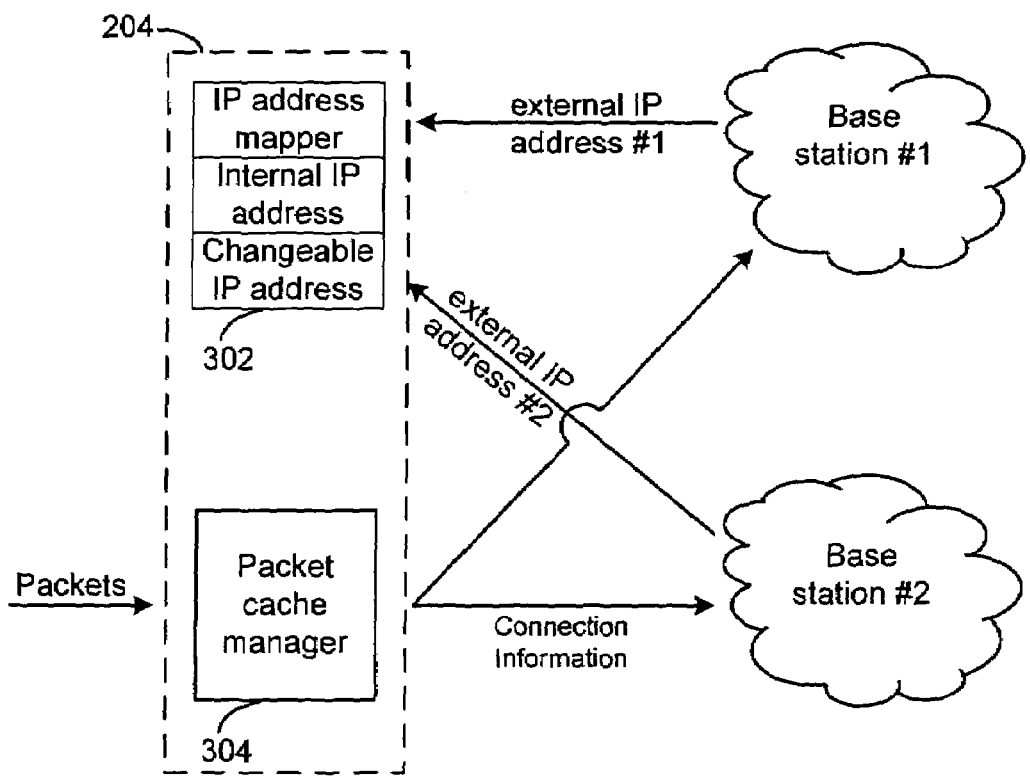
FIG. 3 depicts shows a data flow for providing a seamless interfacing for various base stations according to one embodiment of the present invention.

FIG. 3 depicts shows a data flow for providing a seamless interfacing for various base stations according to one embodiment of the present invention. As shown, interface 204 includes an IP address mapper 302 and a packet cache manager 304.

IP address mapper 302 includes storage for an internal IP address and a changeable IP address. When application 202 connects to a first base station #1, an external IP address #1 is provided to application 202 from base station #1. Interface 202 receives the external address #1 and stores it as the changeable IP address. Interface 204 also generates an internal IP address for application 202. This internal IP address may be used to map to external IP addresses as they change. Accordingly, IP address mapper 302 maps the internal IP address for application 202 to the changeable IP address stored for application 202.

When application 202 first connects to first base station #1, packets that include connection information needed to connect the application to a base station are sent. Interface 204 is configured to determine the connection information from the packets and store the information in packet cache manager 304. The connection information will be later used when connecting to a second base station.

As communications for application 202 are received, they are forwarded to and from application 202 using the IIP address and changeable IP address. IM server 212 may send an IM to the changeable IP address. Interface 204 receives the IM and maps the changeable IP address to the IIP address. Interface 204 then sends the IM to the IIP address and thus application 202. In the other direction, application 202 may send an IM to the IIP address. Interface 204 receives the IM and maps the IIP address to the changeable IP address. Interface 204 then sends the IM to the changeable IP address, which is routed to IM server 212 for routing to a user.

When application 202 moves into the range a second base station #2 and possibly out of the range of first base station #1 (application may still be in the range of first base station #1 but the signal may be weak), an external IP address #2 is provided to application 202 from base station #2. IP address mapper 302 stores the external IP address #2 as the changeable IP address. The changeable IP address is then mapped to the IIP address for application 202. Now, communications from application 202 are sent to the IIP address and mapped to the new changeable IP address and communications to application 202 are sent to the new changeable IP address and mapped to the IIP address.

In order to connect to second base station #2, the connection information is sent to second base station #2. Conventionally, application 202 would send the connection information. However, because packet cache manager 304 is storing the connection information, it can send the information to second base station #2. The connection can then be made as if application 202 connected to second base station #2. By caching the connection information, the transfer from first base station #1 to second base station #2 appears seamless to application 202.

While the change between networks is happening, packet cache manager 304 stores packets received from application 202. Also, packets received for application 202 may be stored in packet cache manager 304. When the IIP address is mapped to the new changeable IP address, the cached packets are sent to application 202 or sent to the recipient that they were destined for. Accordingly, the packets that are sent during any connection change while roaming across base stations may be sent when the IIP address is mapped to the new changeable IP address.

IP address mapper 302 may choose the best connection that can be mapped to the internal IP address. For example, there may be many base stations that can be connected to by application 202. The connection to the base station with the highest connection strength may be chosen. Other factors may also be taken into account.

IP address mapper 302 is responsible for connection establishment, teardown and management. If UDP (uniform datagram protocol) packets are being sent, they are connectionless and can be cached and sent later. However, if transfer control protocol (TCP) sessions are being used, which are connection oriented, IP address mapper 302 is responsible for mapping the connection using the internal IP address with the external connections managed by IP address mapper 302 on the wireless network. When a connection to a base station is lost, interface 204 may make it appear to application 202 that a connection is still alive. For example, packets may from application 202 may be cached. Because the initial connection information is not needed, interface 204 can make it appear to application 202 that a connection is still alive and does not need the initial connection information when a new connection is established.

Accordingly, using the IIP address, application 202 does not need to reinstate a new IP address. Rather, the IIP address that is sent to application 202 may be constant even though new connections to base stations are made. IP mapper 302 maps the IIP address to the changing external IP addresses. Accordingly, even though network coverage may not be available for a certain time, application 202 does not need to initialize with the new base station. Accordingly, application 202 still thinks it is connected to a wireless network.

Packets sent during a change of IP addresses may also not be lost. The ability to cache outgoing packets in the event of the loss of connectivity with a wireless network is provided. These packets may be retransmitted when the connection is reestablished by the IP address mapper.

Figure 4:
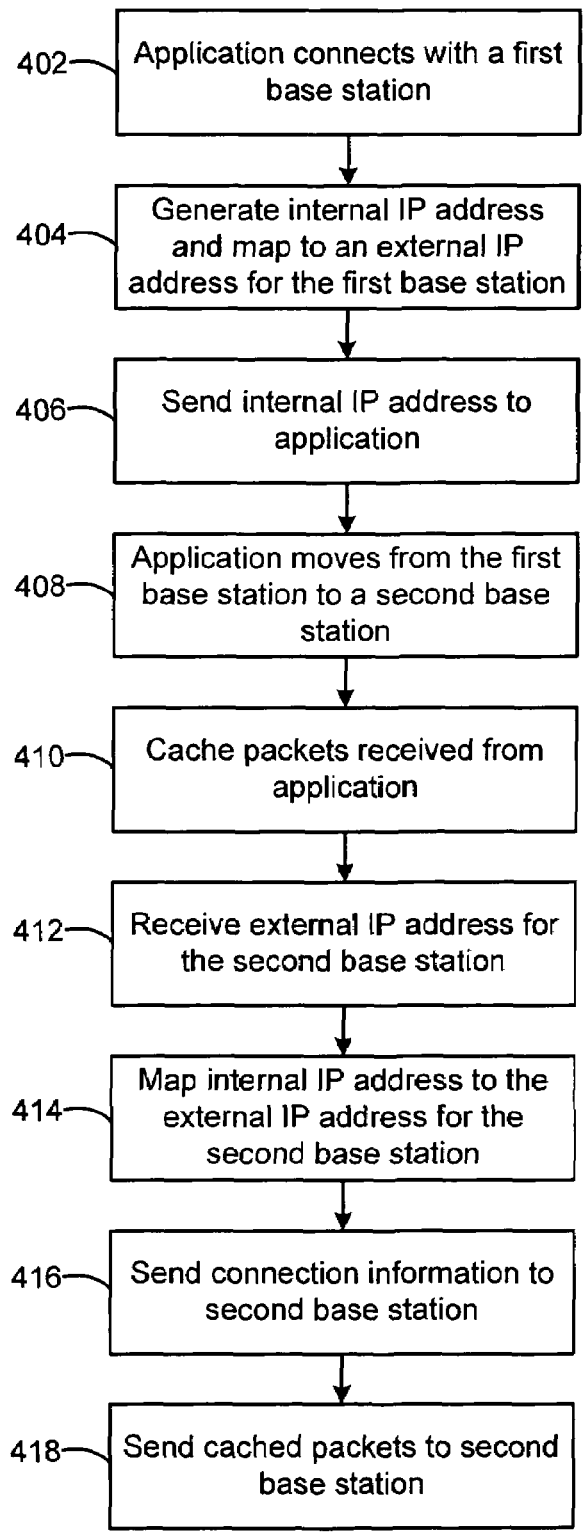
FIG. 4 depicts a method for providing seamless interfacing with wireless networks according to one embodiment of the present invention.

FIG. 4 depicts a method for providing seamless interfacing with wireless networks according to one embodiment of the present invention. In step 402, application 202 connects with a first wireless network. The connection may be made by application 202 initiating a connection with the base station. The base station may then send an external IP address to the application 202. Additionally, connection information from packets sent by application 202 is determined and stored.

In step 404, an IIP address is generated by IP address mapper 302 and is mapped to the external IP address for the first base station.

In step 406, the IIP address generated is then sent to application 202. Interface 204 then sends the external IP address to IM server 212 through base station #1. IM server 212 can then identify application using the external IP address (which is mapped to the IIP by interface 204).

In step 408, application 202 moves from base station #1 to base station #2. While moving from the base station #1 to the base station #2, connectivity may be lost. Accordingly, in step 410, packets are cached that are received from application 202. Additionally, packets received for application 202 may be cached.

In step 412, an external IP address for base station #2 is received. The external IP address is saved as the changeable IP address and mapped to the internal IP address. Accordingly, connection may be restored for application 202 when the internal IP address is mapped to external IP address in step 414.

In step 416, the connection information is sent to base station #2 allowing a connection to base station #2 to be established with application 202. Accordingly, application 202 still thinks the connection has been maintained. Also, application 202 does not need to re-send connection information to reconnect to base station #2.

In step 418, any cached packets are sent to base station #2 for the routing to their destination. Additionally, any cached packets for application 202 are sent to application 202. Also, the new changeable IP address may be sent to IM server 212 so it can allow IM communications with the IM client.

Thus, by mapping internal IP address to the external IP addresses and storing connection information, interface 204 may provide seamless interfacing with wireless network. This provides the advantage in that it seems to a user and application that a connection is not lost. A user can thus continue to send messages to a network and have the packets for the messages cached. When connection is restored, the packets are then sent to the new wireless network. Also, application 202 does not need to reinstate a new IP address. Rather, by using the internal IP address, the internal IP address stays constant even though an application is moving from various wireless networks that use different IP addresses.

From an IM client application's point of view, moving from one base station to another is not seen as a failure, but just a slower response time as a network is reacquired and the changeable IP address changes. As a result, an IM client application does not need to drop the current session and start over. When interface 204 detects a change, the change is reported to the IM server. Packets are sent in an efficient manner once the IM client once again indicates availability. For example, interface 204 sends the IP address and presence information through the new network to IM server 212. IM server 212 can then update its records and send packets through the new wireless network.

FURTHER EMBODIMENTS

While the invention has been described with respect to specific embodiments, one skilled in the art will recognize that numerous modifications are possible.

The embodiments described herein may make reference to web sites, links, and other terminology specific to instances of communications systems. It should be understood that the systems and processes described herein can be adapted for use with a different data transport technology.

The present invention can be implemented in the form of control logic in software or hardware or a combination of both. The control logic may be stored in an information storage medium as a plurality of instructions adapted to direct an information processing device to perform a set of steps disclosed in embodiment of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for providing instant message communications while roaming between a plurality of base stations, the method comprising:
   receiving a first external internet protocol (IP) address for a first base station; mapping the first external IP address to an internal IP address for an IM client;
   allowing communications with the first base station using the external IP address and internal IP address;
   receiving a second external internet protocol (IP) address for a second base station;
   mapping the second external IP address to the internal IP address for an IM client;
   determining connection information for the IM client:
   storing the connection information; and
   sending the connection information to the second base station to establish a connection with the second base station; and
   allowing communications with the second base station using the external IP address and internal IP address.

2. The method of claim 1, wherein the IM client does not need to send the connection information when the connection with the second base station is established.

3. The method of claim 1, further comprising:
   sending presence information to an IM server indicating a status of the IM client at the first external IP address.

4. The method of claim 1, further comprising sending the external IP address to an IM server, the IM server configured to provide IM communications to the IM client using the external IP address.

5. The method of claim 1, further comprising:
   receiving an IM from the IM client at the internal IP address;
   mapping the internal IP address to the first or second external IP address; and
   sending the IM using the first or second external IP address.

6. The method of claim 1, further comprising caching data received from the IM client during a change in connection from the first base station to the second base station.

7. The method of claim 6, further comprising sending the cached data when a connection to the second base station is changed.

8. The method of claim 1, wherein the internal IP address remains constant during the communications with the first base station and the second base station.

9. The method of claim 1, wherein the second base station is selected from the plurality of base stations based on a base station with the plurality having a highest connection strength.

10. The method of claim 1, wherein the base station comprises a wireless network.

11. An interface for providing IM communications over a plurality of networks, the interface comprising:
    an internal address store configured to store an internal address for an IM client;
    a changeable address store configured to store an external address for a base station;
    an address mapper configured to map the internal address for the IM client to the changeable address, wherein the changeable address changes based on external addresses received from a plurality of base station, the plurality of base stations being connected to by the IM client at different times and
    a cache configured to store connection information for the IM client, the connection information used to establish a connection with a second base station in the plurality of base stations after a connection with a first base station is lost.

12. The interface of claim 11, wherein the plurality of base stations comprise wireless networks.

13. The interface of claim 11, wherein the internal address and external address comprise an IP address.

14. A method for providing instant message communications while roaming between a plurality of base stations, the method comprising:
    receiving a first external internet protocol (IP) address for a first base station; mapping the first external IP address to an internal IP address for an IM client;
    allowing communications with the first base station using the external IP address and internal IP address;
    receiving a second external internet protocol (IP) address for a second base station;
    mapping the second external IP address to the internal IP address for an IM client;
    sending the external IP address to an IM server, the IM server configured to provide IM communications to the IM client using the external IP address; and
    allowing communications with the second base station using the external IP address and internal IP address by:
    receiving an IM from the IM server for the first external IP address;
    mapping the first external IP address to the internal IP address; and
    sending the IM to the internal IP address.

15. The method of claim 14, further comprising:
    receiving a second IM from the IM server for the second external IP address;
    mapping the second external IP address to the internal IP address; and
    sending the IM to the internal IP address.

16. The method of claim 14, further comprising sending the external IP address to an IM server, the IM server configured to provide IM communications to the IM client using the external IP address.

17. The method of claim 14, further comprising:
    selecting the second base station from the plurality of base stations based one a base station within the plurality having a highest connection strength.

18. The method of claim 14, wherein the plurality of base stations comprise wireless networks.

19. An interface for providing IM communications over a plurality of networks, the interface comprising:

an internal address store configured to store an internal address for an IM client;

a changeable address store configured to store an external address for a base station;

an address mapper configured to map the internal address for the IM client to the changeable address, wherein the changeable address changes based on external addresses received from a plurality of base station, the plurality of base stations being connected to by the IM client at different times; and a cache configured to store data for the IM client when a change in connection from a first base station in the plurality of base station to a second base station in the plurality of base stations occurs.

20. The interface of claim 19, wherein the plurality of base stations comprise wireless networks.

\* \* \* \* \*

UNITED STATES PATENT AND TRADEMARK OFFICE
CERTIFICATE OF CORRECTION

PATENT NO. : 7,260,082 B2 Page 1 of 1
APPLICATION NO. : 11/056213
DATED : August 21, 2007
INVENTOR(S) : Yarlagadda It is certified that error appears in the above-identified patent and that said Letters Patent is hereby corrected as shown below:

In column 8, line 63, in Claim 17, after "based", delete "one" and insert --on --.

Signed and Sealed this

Twentieth Day of November, 2007

JON W. DUDAS
*Director of the United States Patent and Trademark Office*